United States Patent
Lunttila et al.

(10) Patent No.: US 10,187,808 B2
(45) Date of Patent: Jan. 22, 2019

(54) MULTIPOINT TRANSMISSIONS

(71) Applicant: Nokia Siemens Networks Oy, Espoo (FI)

(72) Inventors: Timo Erkki Lunttila, Espoo (FI); Klaus Hugl, Vienna (AT)

(73) Assignee: Nokia Solutions and Networks Oy, Espoo (FI)

( * ) Notice: Subject to any disclaimer, the term of this patent is extended or adjusted under 35 U.S.C. 154(b) by 391 days.

(21) Appl. No.: 13/887,531

(22) Filed: May 6, 2013

(65) Prior Publication Data

US 2013/0294273 A1    Nov. 7, 2013

(51) Int. Cl.
*H04W 24/00* (2009.01)
*H04L 5/00* (2006.01)

(52) U.S. Cl.
CPC ......... *H04W 24/00* (2013.01); *H04L 5/0035* (2013.01); *H04L 5/0048* (2013.01); *H04L 5/0053* (2013.01)

(58) Field of Classification Search
None
See application file for complete search history.

(56) References Cited

U.S. PATENT DOCUMENTS

| 8,750,887 B2 * | 6/2014 | Chandrasekhar | H04L 5/0096 370/252 |
| 2011/0206106 A1 * | 8/2011 | Mallik | H04B 7/024 375/226 |
| 2012/0002740 A1 * | 1/2012 | Han | H04L 5/0048 375/260 |
| 2012/0039282 A1 * | 2/2012 | Kim | H04W 52/54 370/329 |
| 2012/0120903 A1 * | 5/2012 | Kim | H04B 7/024 370/329 |
| 2012/0176982 A1 * | 7/2012 | Zirwas | H04B 7/024 370/329 |
| 2012/0182946 A1 * | 7/2012 | Chen | H04L 5/0032 370/329 |
| 2012/0207105 A1 * | 8/2012 | Geirhofer | H04L 5/0032 370/329 |
| 2012/0264441 A1 * | 10/2012 | Chandrasekhar | H04L 5/0073 455/450 |

(Continued)

FOREIGN PATENT DOCUMENTS

| CN | 101409921 A | 4/2009 |
| CN | 101848485 A | 9/2010 |

(Continued)

OTHER PUBLICATIONS

Huawei et al: "Signalling requirements for PDSCH mapping for DL CoMP"; R1-120037; 3GPP TSG RAN FWG1 meeting #68, Dresden, Germany, Feb. 6-10, 2012; pp. 1-9; 3rd Generation Partnership Project (3GPP); Mobile Competence Centre; 650, Route des Lucioles; F-06921 Sophia-Antipolis Cedex; France, (9 pages).

(Continued)

*Primary Examiner* — Ayaz R Sheikh
*Assistant Examiner* — Faiyazkhan Ghafoerkhan
(74) *Attorney, Agent, or Firm* — Harrington & Smith (57) ABSTRACT

In scheduling of downlink multipoint transmissions at least one resource element is left free of the downlink channel. Data representing interference is then inserted in said at least one resource element for use in interference measurements.

14 Claims, 3 Drawing Sheets

(56) References Cited

U.S. PATENT DOCUMENTS

| | | | | |
|---|---|---|---|---|
| 2013/0039284 A1* | 2/2013 | Marinier | H04L 5/001 | 370/329 |
| 2013/0114427 A1* | 5/2013 | Maattanen | H04B 7/024 | 370/252 |
| 2013/0136062 A1* | 5/2013 | Gorokhov | B25B 23/0021 | 370/328 |
| 2013/0196675 A1* | 8/2013 | Xiao | H04W 72/082 | 455/452.1 |
| 2013/0208604 A1* | 8/2013 | Lee | H04L 25/0226 | 370/252 |
| 2013/0235911 A1* | 9/2013 | Geirhofer | H04B 7/0417 | 375/219 |
| 2013/0286849 A1* | 10/2013 | Park | H04B 7/024 | 370/241 |
| 2014/0355408 A1* | 12/2014 | Tong | H04J 13/0003 | 370/208 |
| 2015/0171948 A1* | 6/2015 | Xiao | H04W 72/082 | 370/252 |

FOREIGN PATENT DOCUMENTS

| | | | | |
|---|---|---|---|---|
| CN | 101998453 A | 3/2011 | | |
| CN | 102149124 A | 8/2011 | | |
| WO | WO 2014069955 A1 * | 5/2014 | | H04B 7/024 |

OTHER PUBLICATIONS

Nokia Siemens Networks et al: Interference measurement support for Rel-11; R1-120722; 3GPP TSG RAN WG1 Meeting #68, Dresden, Germany, Feb. 6-10, 2012; pp. 1-4; 3rd Generation Partnership Project (3GPP); Mobile Competence Centre; 650, Route des Lucioles; F-06921 Sophia-Antipolis Cedex; France, (4 pages).

3GPP TSG-RAN WG1 #61bis, Dresden, Germany, Jun. 28-Jul. 2, 2010, R1-103843, "Views on CSI RS Muting", Ericsson, ST-Ericsson, 3 pgs.

3GPP TSG RAN WG1 Meeting #68bis, Jeju, Korea, Mar. 26-30, 2012, R1-121091, "Discussion on interference measurement resources", CATT, 5 pgs.

3GPP TSG-RAN WG1 Meeting #68bis, Jeju, Korea, Mar. 26-30, 2012, R1-121092, "Consideration on interference measurement", CATT, 4 pgs.

3GPP TSG-RAN WG1 Meeting #68bis, Jeju, Korea, Mar. 26-30, 2012, R1-121392, "Further study on interference estimation resources" Renesas Mobile Europe Ltd., 9 pgs.

3GPP TSG-RAN WG1 #68bis, Jeju, Korea, Mar. 26-30, 2012, R1-121741, "Interference Measurements for CoMP CSI Reporting", Ericsson, ST-Ericsson, 2 pgs.

* cited by examiner

MULTIPOINT TRANSMISSIONS

This disclosure relates to multipoint transmission in a communication system, and more particularly to providing an interference reference for use in interference measurements.

A communication system can be seen as a facility that enables communication sessions between two or more entities such as fixed or mobile communication devices, base stations, servers, machine type communication devices and/ or other communication nodes. A communication system and compatible communicating entities typically operate in accordance with a given standard or specification which sets out what the various entities associated with the system are permitted to do and how that should be achieved. For example, the standards, specifications and related protocols can define the manner how various aspects of communication such as access to the communication system and feedback messaging shall be implemented between communicating devices Communications can be carried on wired or wireless carriers. In a wireless communication system at least a part of communications between stations occurs over a wireless link. Examples of wireless systems include public land mobile networks (PLMN) such as cellular networks, satellite based communication systems and different wireless local networks, for example wireless local area networks (WLAN). A wireless system can be divided into cells or other radio coverage or service areas provided by a station. Radio service areas can overlap, and thus a communication device in an area can send signals to and receive signals from more than one station.

A communication system can be accessed by means of an appropriate communication device. A communication device of a user is often referred to as user equipment (UE) or terminal. A communication device is provided with an appropriate signal receiving and transmitting arrangement for enabling communications with other parties. Typically a communication device is used for enabling receiving and transmission of communications such as speech and data. In wireless systems a communication device provides a transceiver station that can communicate with another communication device such as e.g. a base station and/or another user equipment.

An example of communication systems is an architecture that is being standardized by the 3rd Generation Partnership Project (3GPP) and referred to as the long-term evolution (LTE) of the Universal Mobile Telecommunications System (UMTS) radio-access technology. A further development of the LTE is often referred to as LTE-Advanced. The various development stages of the 3GPP LTE specifications are referred to as releases.

More advanced transmission schemes are becoming increasingly desirable with the technical evolution. For example, multipoint transmission and/or reception schemes have been proposed. An example of these is Coordinated MultiPoint (CoMP) transmission and reception technology considered for 3GPP LTE-Advanced to enhance data rates. CoMP can be used specifically to enhance cell-edge data rates in order to create a more uniform data rate experience for the end-user over the entire cell area. The CoMP techniques involve increased collaboration between different network nodes in downlink (DL) transmission to the UE and uplink (UL) reception from the UE. Thus a UE may communicate with multiple network nodes at the same time. The network nodes can provide transmission points (TP), for example LTE eNodeBs. Different DL CoMP transmission strategies are contemplated. In joint transmission (JT) a UE can simultaneously receive from more than one transmission point. In dynamic point selection (DPS) the network dynamically selects one of possible multiple transmission points to serve a UE, whereas the remaining transmission points may serve other UEs on the available resources. In DPS with blanking a network dynamically selects one of possible multiple transmission points to serve a UE, but the remaining transmission points are refraining from transmitting and therefore will not produce any downlink interference for the UE.

Interference measurement is supported differently for CoMP channel state information (CSI) calculation in LTE release 11 compared to previous releases. In LTE(-A) up to release 10, the interference in the UE for CSI calculation purpose is expected to be measured based on the common reference signals (CRS). However, release 11 introduces interference measurement resource elements (IM REs). These are believed reflect better the interference situation in the case of DL CoMP operation. Different interference measurement resources may be configured and operated by the network. However, it has not been resolved how the eNB could ensure that representative interference is actually present at the interference measurement resources which are the same resource elements (time-frequency locations in the DL subframe) that can be configured/addressed by channel state information reference signal (CSI-RS) resources.

To expand this a bit, an UE should know for its CoMP operation its own interference measurement (IM) Resource Configuration(s) for interference measurement. To provide this certain resource elements (REs) in interference measurement (IM) configuration can be fixed. For DL CoMP joint transmission (JT) where the UE can simultaneously receive data from more than one transmission point the situation can become relatively complicated. This may be so because those REs for transparent joint transmissions which are to be kept empty by at least one of the involved transmission points cannot be used for physical downlink shared channel (PDSCH) transmission. However, fixing certain REs such that they are not to be used for data transmission on a shared channel means that it may become impossible to obtain any meaningful interference estimate as the resource elements (REs) where interference is supposed to be measured are in fact empty, i.e. a PDSCH is not transmitted on them.

It is noted that the above discussed issues are not limited to any particular communication environment, but may occur in any appropriate communication system where multipoint transmission can take place.

Embodiments of the invention aim to address one or several of the above issues.

In accordance with an embodiment there is provided a method for transmission of a downlink channel, comprising leaving at least one resource element free of the downlink channel when scheduling a multipoint transmission, and inserting data representing interference in said at least one resource element for use in interference measurements.

In accordance with another embodiment there is provided an apparatus for controlling downlink transmissions, the apparatus comprising at least one processor, and at least one memory including computer program code, wherein the at least one memory and the computer program code are configured, with the at least one processor, to leave at least one resource element free of a downlink channel when scheduling a multipoint transmission, and to insert data representing interference in said at least one resource element for use in interference measurements.

The data representing interference may comprise at least one of data of at least one resource element configured for another recipient, random or pseudo random bits or symbols, and downlink channel from another physical resource block.

The downlink channel may comprise a physical downlink shared channel.

Similar modulation and precoding for said data representing the interference than for downlink channel data may be applied in a physical resource block. Alternatively, a different modulation and precoding may be applied for said data representing the interference than for downlink channel data.

A modulation and precoding for the data representing the interference may be selected that reflects typical operation of a wireless system where the wireless communications is provided.

It can be determined whether downlink channel data is to be transmitted in a physical resource block including said at least one resource element for use in interference measurements, and in response thereto, said at least one resource element for use in interference measurements may be left empty or said data representing interference may be inserted.

A coordinated multipoint transmission mechanism and rate matching of a physical downlink shared channel around said at least one resource element may be provided, wherein said data representing interference is for use in estimation of channel state information by a user equipment.

The apparatuses may be provided and the methods implemented in a node for a communication system. The node may comprise enhanced Node B.

A computer program comprising program code means adapted to perform the methods may also be provided.

Various other aspects and further embodiments are also described in the following detailed description and in the attached claims.

The invention will now be described in further detail, by way of example only, with reference to the following examples and accompanying drawings, in which.

Certain exemplifying embodiments are explained below with reference to a wireless or mobile communication system serving mobile communication devices. Before explaining in detail the exemplifying embodiments, certain general principles of wireless communications are briefly explained with reference to FIGS. 1 and 2 to assist in understanding the technology underlying the described examples.

Figure 1:
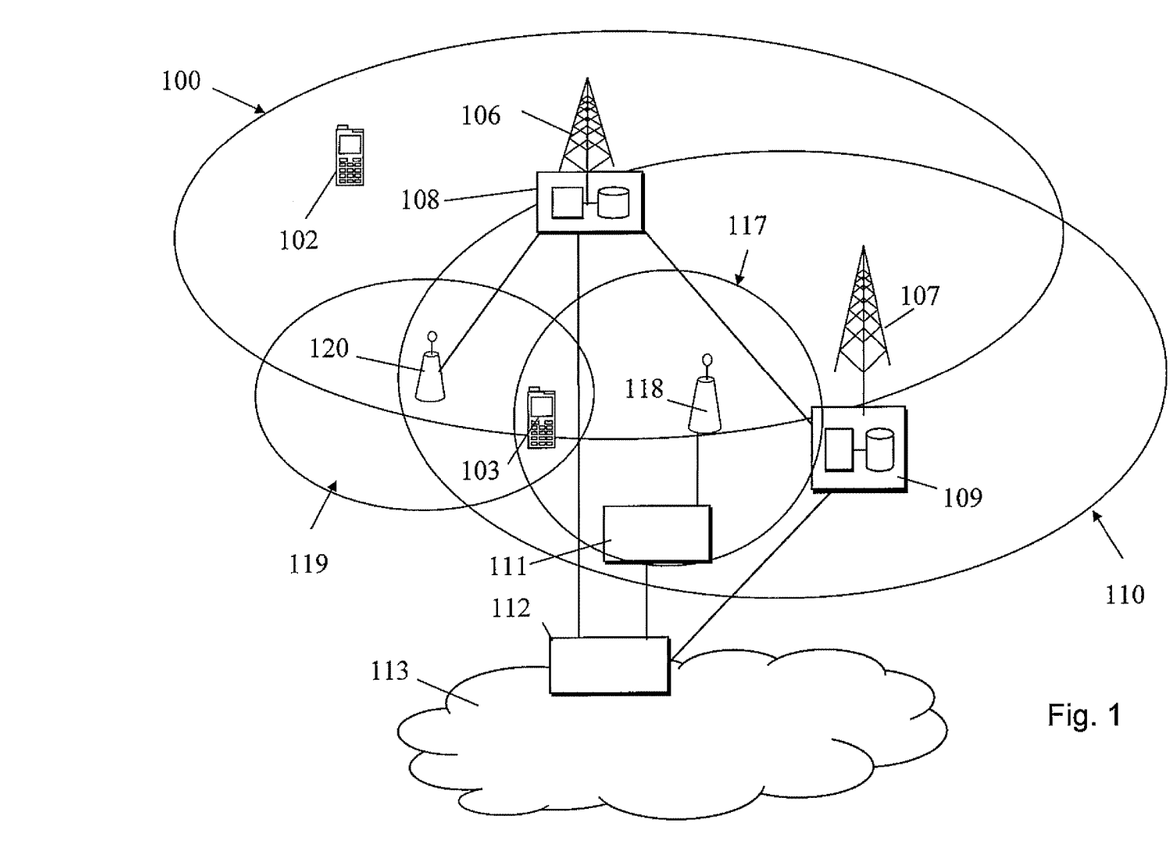
FIG. 1 shows a schematic diagram of a system where some embodiments are applicable.

In a wireless communication system mobile communication devices or user equipment (UE) 102, 103 are provided wireless access via at least one base station or similar wireless transmitting and/or receiving node or point. In the example of FIG. 1 overlapping access systems or radio service areas 100 and 110 of a cellular system and smaller radio service areas 117 and 119 are provided by base stations 106, 107, 118 and 120. For example, in the LTE the transmission/reception points can comprise wide area network nodes such as Node B (NB) or enhanced eNode B (eNB). The nodes may provide coverage for an entire cell or similar radio service area. Network nodes can also be small or local radio service area network nodes, for example Home eNBs (HeNB), pico eNodeBs (pico-eNB), or femto nodes. Some applications may utilise radio remote heads (RRH) that are connected to, for example, an eNB. The smaller radio service areas can be located wholly or partially within the larger radio service area. The nodes of the smaller radio service areas may be configured to support local offload. The local nodes can also, for example, be configured to extend the range of a cell. Communication device 103 may thus be located within, and thus communicate with, more than one radio service area and the communication devices and stations may have one or more radio channels open at the same time and may send signals to and/or receive signals from more than one source. It is noted that the radio service area borders or edges are schematically shown for illustration purposes only in FIG. 1. It shall also be understood that the sizes and shapes of radio service areas may vary considerably from the shapes of FIG. 1. A base station site can provide one or more cells. A base station can also provide a plurality of sectors, for example three radio sectors, each sector providing a cell or a subarea of a cell. All sectors within a cell can be served by the same base station.

Transmission points are typically controlled by at least one appropriate controller apparatus so as to enable operation thereof and management of mobile communication devices in communication therewith. In FIG. 1 control apparatus 108 and 109 is shown to control respective base stations 106 and 107. It is noted that more than one transmission point may be controlled e.g. by control apparatus 108. In below described embodiments the control apparatus can be provided by any apparatus capable of providing a scheduler function. For example, a node can provide a "master node" for a joint-scheduler operation. In such arrangement the controlling function can be provided for example in association with a master eNB, e.g. eNB 106.

In FIG. 1 stations 106 and 107 are shown being connected to a wider communications network 113 via gateway 112. A further gateway function may be provided to connect to another network. The smaller area stations 118 and 120 can also be connected to the network 113, for example by a separate gateway function and/or via the controllers of the macro level stations. In the example, station 118 is connected via a gateway 111 whilst station 120 can provide a remote radio head that connects via the controller apparatus 108.

A communication device of a user for communication with the stations is often referred to as user equipment (UE) or terminal. An appropriate communication device may be provided by any device capable of sending and receiving radio signals. Non-limiting examples include a mobile station (MS) such as a mobile phone or what is known as a 'smart phone', a portable computer provided with a wireless interface card or other wireless interface facility, personal data assistant (PDA) provided with wireless communication capabilities, or any combinations of these or the like. A mobile communication device may provide, for example, communication of data for carrying communications such as voice, electronic mail (email), text message, multimedia and so on. Users may thus be offered and provided numerous services via their communication devices. Non-limiting examples of these services include two-way or multi-way calls, data communication or multimedia services or simply an access to a data communications network system, such as the Internet. User may also be provided broadcast or multicast data. Non-limiting examples of the content include various downloads, television and radio programs, videos, advertisements, various alerts and other information. The device may receive signals over an air interface via appropriate apparatus for receiving and may transmit signals via appropriate apparatus for transmitting radio signals. The antenna arrangement may be arranged internally or externally to the mobile device. A wireless communication device can be provided with a Multiple Input/Multiple Output (MIMO) antenna system.

Figure 2:
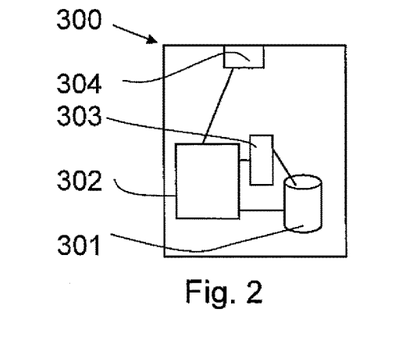
FIG. 2 shows a schematic diagram of a control apparatus according to some embodiments.

FIG. 2 shows an example of a control apparatus for a communication system, for example to be coupled to and/or for controlling one or more stations of an access system or a communication device. The control apparatus 300 can be arranged in control at least one transmission point and to provide control on communications in a service area of the system. The control apparatus can be configured to provide control functions in association with scheduling or transmission and generation and communication of signals for interference measurements by mobile devices in accordance with certain embodiments described below. For this purpose the control apparatus 300 comprises at least one memory 301, at least one data processing unit 302, 303 and an input/output interface 304. Via the interface the control apparatus can be coupled to a receiver and a transmitter of a base station. The control apparatus 109 can be configured to execute an appropriate software code to provide the control functions. It shall be appreciated that similar component can be provided in a control apparatus provided elsewhere in the system for controlling reception of sufficient information for decoding of received information blocks.

A non-limiting example of the recent developments in communication system architectures is the long-term evolution (LTE) of the Universal Mobile Telecommunications System (UMTS) that is being standardized by the 3rd Generation Partnership Project (3GPP). Non-limiting examples of appropriate LTE access nodes are a base station of a cellular system, for example what is known as NodeB (NB) in the vocabulary of the 3GPP specifications. The LTE employs a mobile architecture known as the Evolved Universal Terrestrial Radio Access Network (E-UTRAN). Base stations of such systems are known as evolved or enhanced Node Bs (eNBs) and may provide E-UTRAN features such as user plane Radio Link Control/Medium Access Control/Physical layer protocol (RLC/MAC/PHY) and control plane Radio Resource Control (RRC) protocol terminations towards the communication devices. Other examples of radio access system include those provided by base stations of systems that are based on technologies such as wireless local area network (WLAN) and/or WiMax (Worldwide Interoperability for Microwave Access).

As mentioned above, Coordinated MultiPoint (CoMP) transmission and reception technologies are considered for 3GPP LTE-Advanced to enhance data rates. The CoMP techniques involve increased collaboration between different transmission points in downlink (DL) transmission to the UE and uplink (UL) reception from the UE. Currently the envisaged CoMP measurement transmission point set sizes in 3GPP are 2 and 3. Thus a possible interference measurement operation can be considered for a case of three collaborating transmission points, i.e. for a CoMP measurement set size of 3. An issue with measurements may arise in that fixing of certain resource elements (RE) such that they are not to be used for data transmission may also mean that it becomes impossible, or at least difficult, to obtain any meaningful interference estimate as the REs where interference is supposed to be measured are in fact configured as being empty, i.e. free from PDSCH transmission.

To illustrate this, in the following certain possible CoMP transmission hypothesis for different interference measurement resource configurations are briefly discussed for a CoMP measurement set size of 3 (for the principle of configurations, see e.g. FIG. 4):

Configuration 1, representing interference from transmission point 1 (TP1): For UEs to measure interference assuming either joint transmission (JT) from TP2 & TP3 or DPS with blanking of TP2/TP3.

Configuration 2 and 3: corresponding to configuration 1 but for the TP pairs TP1/TP3 (Configuration 2) and TP1/TP2 (Configuration 3).

Configuration 4, represents interference from TP1 & TP2: For UEs to measure interference assuming transmission from TP3 (with TP1 & TP2 interfering).

Configuration 5 & 6: corresponding to Configuration 4 but for transmission from TP1 (Configuration 5, interference from TP2&TP3) and transmission from TP2 (Configuration 6, interference from TP1 &TP3).

It is noted that the example discussed here presents a situation of a CoMP measurement set size of 3 for a single UE. There can be more transmission points in a network and the CoMP measurement sets of different UEs in the network may not be the same, but at least partially overlapping. This can extend this issue over the full CoMP collaboration set/area which is given by the network deployment.

An UE shall be aware of its interference measurement (IM) resource configuration(s) for interference measurement for the purposes of CoMP operation. Depending on the intended eNB measurement and operation, information on relevant IM RE configuration(s) may be signalled to the UE combined with the CSI-RS resource to be used for CSI calculations. The UE can also be made aware of PDSCH rate-matching around IM REs, i.e. provided with information about those REs which are not used for PDSCH transmission to the UE and are thus kept PDSCH free. Rate matching refers to operation for matching the amount of data to be transmitted to the available capacity of the physical channels. Rate matching can be done e.g. by puncturing the bits if there are too much data for the capacity of the physical channel or through repeating the bits if there is less number of bits when compared to the physical channel capacity. Rate matching on PDSCH is independent on the CSI feedback mode and can depend on the eNB CoMP transmission mode selection.

For single point transmissions from TP1, TP2, TP3 the IM REs of Configurations [2,3,5], [1 3,6] or [1 2,4] need to be rate-matched accordingly. This can mean that all the configurations that are supposed to be empty also need to be in reality PDSCH free. For a joint transmission (JT) the situation can become even more complicated, as for assuming transparent JT the combined empty REs cannot be used for PDSCH transmission. For example, for JT of TP1 and TP2, at least IM Configurations [1,2,3,5,6] may need to be kept free.

Depending on the CoMP transmission mode an option for PDSCH resource element mapping is to semi-statically use a higher-layer (RRC) configured rate-matching pattern where PDSCH data is left out those REs that at least in one of the TPs of the CoMP measurement set that need to be kept free of interference. However, it should also be ensured that those REs which are used for IM REs also represent the correct interference assumption, although the PDSCH from the scheduled UE is mapped/rate-matched around those REs and therefore left empty from PDSCH transmission.

Figure 3:
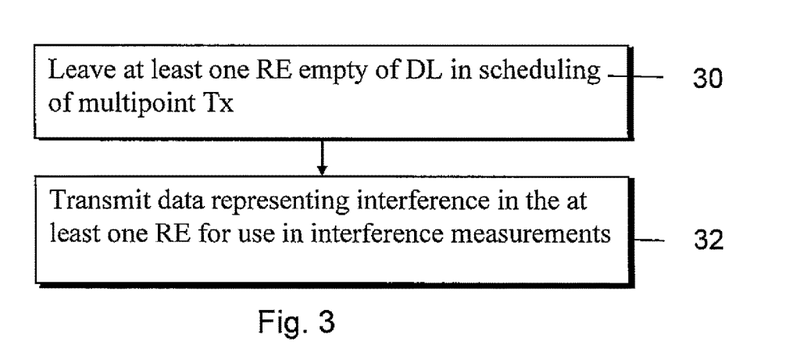
FIG. 3 shows a flow chart according to an embodiment.

FIG. 3 shows a flowchart in accordance with an embodiment for wireless communications via multiple transmission points where the issue of empty resource elements is addressed by insertion of data representing the (missing) interference. In the method at least one resource element is left free of a downlink channel when scheduling a multipoint transmission at 30. Data representing interference is then inserted into and transmitted at 32 in said at least one resource element for use in interference measurements.

Detailed examples for providing an interference measurement resource are described below in the context of 3GPP LTE-Advanced Coordinated Multipoint Transmission (CoMP). According to an embodiment the downlink channel comprises a PDSCH. The herein described embodiment may provide interference measurements based on interference measurement resource elements (IM REs) that reflect reasonably accurately the actual interference situation. In the embodiments dummy data can be transmitted on REs that are not used for PDSCH when they could have been. These REs are denoted herein as interference reference REs (IR REs). Thus transmission points (TPs) of a multipoint transmission arrangement can transmit dummy data on resource elements (REs) that should represent interference but which are empty and around which a physical downlink shared channel (PDSCH) is rate matched.

The dummy data that may be transmitted on IR REs is denoted herein as "Interference Measurement Reference Signals" (IM-RS). The dummy data (IM-RS) may include e.g. (pseudo-) random or predefined bits or symbols. Correct interference can be shown through the IM-RS to UEs measuring the interference from specific IM REs.

In accordance with an embodiment the IR REs may include e.g. some of the REs configured as interference measurement resource elements (IM REs) for other devices, for example other user equipment.

The same modulation and precoding can be applied for the IM-RS as for the PDSCH on the same PRB. This can be used to ensure that the IM-RS represents closely the interference caused by the PDSCH.

Control of transmission of IM-RSs can be provided by an eNodeB. An eNodeB is aware of the IM RE configurations in the cell/CoMP area, and thus the eNodeB can be arranged to transmit IM-RS on IR REs when considered necessary and beneficial. It may not be necessary to specify in standards when a eNodeB transmits IM-RSs.

Figure 4:
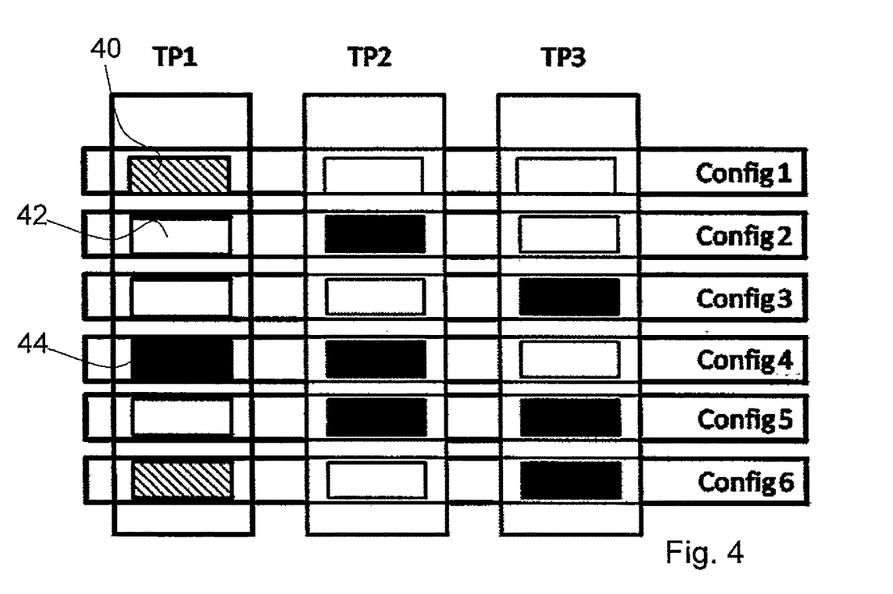
FIGS. 4 and 5 show configurations where certain resource elements are not used for PDSCH.

To illustrate the above in more detail, it can be assumed that two user equipment UE1 and UE2 have a CoMP measurement set containing TP1 and TP2 for IM RE setup by an eNB. PDSCH rate is to be matched around interference measurement (IM) Configurations [1,2,3,5,6], see FIG. 4. In FIG. 4 case for JT for UE1 it is assumed that rate matching is around Configuration [1,2,3,5,6] and the CoMP measurement set is given by TP1 & TP2. UE1 can be scheduled with joint transmission (JT) from TP1 & TP2. Within the allocation of UE1, there should be, although it is possible that there will not be, PDSCH interference produced by PDSCH on configurations 1 and 6 from TP1. The same applies for configurations 2 and 5 from TP2. REs 40 that should present interference, i.e. the IR REs, are denoted by crosshatching. Empty REs 42 are shown as blank and REs 44 presenting interference are shown blackened.

Figure 5:
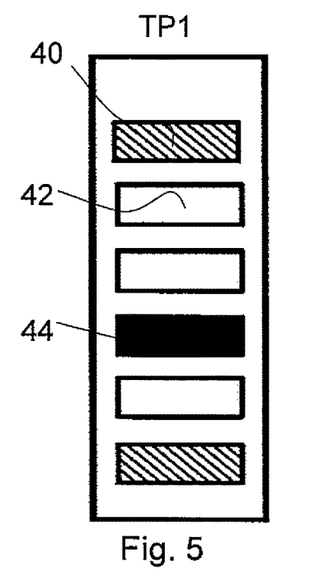

It is also possible to schedule UE2 by dynamic point selection (DPS) from TP1. In this scenario configurations 1 and 6 from TP1 do not show the PDSCH interference either. FIG. 5 shows DPS from TP1 for UE2 where it is assumed that rate matching is provided around configurations [1,2,3, 5,6] as the CoMP measurement set is given by TP1 & TP2.

Figure 6:
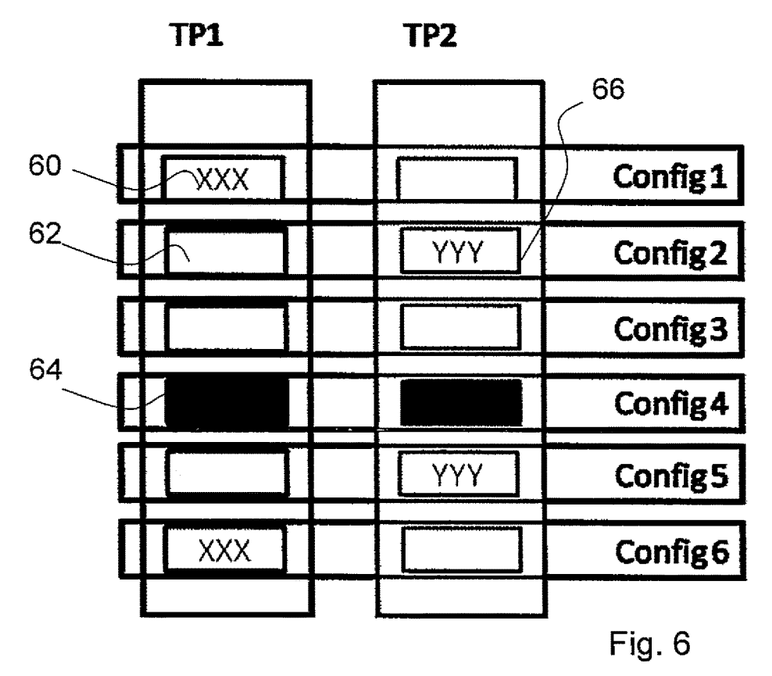
FIGS. 6 and 7 show examples of using the empty resource elements of FIGS. 4 and 5, respectively.

FIG. 6 illustrates dummy interference/IM-RS 60, 66 for the case of joint transmission for UE1 assuming rate matching around Configurations [1,2,3,5,6] where CoMP measurement set is given by TP1 & TP2. The dummy REs 60 correspond to TP1 precoding, UE1 modulation and REs 66 TP2 preceding, UE1 modulation. Empty REs 62 are shown as blank and REs 62 presenting interference are shown blackened. To provide a signal to measure dummy PDSCH (i.e. IM-RS) transmission in IR REs 60 and 66 can be arranged for UE 1 in joint transmission from TP1 and TP2. Same modulation and precoding can be used as for the joint transmission from TP1 is transmitted from TP1 on IM REs of Configurations 1 and 6. Same modulation and precoding as done for joint transmission from TP2 is transmitted from TP2 on IR REs of configurations 2 and 5 as IM-RS.

Figure 7:
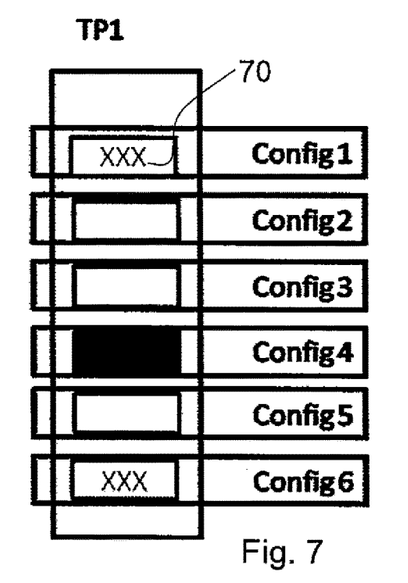

FIG. 7 shows dummy interference/IM-RS 70 for the case of DPS from TP1 for UE2. Rate matching is assumed around Configuration [1,2,3,5,6] as the CoMP measurement set is given by TP1 & TP2. Same modulation and precoding as for the transmission of UE2 from TP1 is used as IM-RS on IR REs of Configurations 1 and 6. Similarly, this list can be extended to all the potential CoMP transmission schemes for this CoMP measurement set.

By a network node specific implementation of IM-RS the network can guarantee a correct interference to be present even if the PDSCH of the current PDSCH allocation is not present on the interference measurement resources.

In case there is no PDSCH transmitted in the same physical resource blocks (PRBs), the IR REs may be left empty. This may be done for example to correctly represent the current load and scheduling decisions in the network.

In case of a low load the network might like to obtain channel state information (CSI) feedback from the UE for the full-load situation as a conservative approach, representing full-load situation. The dummy information from the closest PDSCH occupied PRBs may be used in this scenario for IM-RS.

A network may decide not to transmit dummy bits/IM-RS according to the current PDSCH allocation (modulation, transmission rank and precoding). Instead, the network may be configured to prefer to choose a dummy transmission which in an optimal way reflects typical network operation (i.e. highest probable transmission rank and modulations, combined with a random or currently used precoder in that transmission time interval (TTI)).

Some of the embodiments may provide correct interference situation on the REs used for interference measurement although the REs are kept PDSCH free. The solution is simple from the UE and downlink signalling complexity point of view as rate matching patterns do not need to be adapted depending on which transmission points are used for CoMP transmission. The solution can be transparent to the UEs as the UE may only need to measure interference as configured. There may not be any need to standardize any specific UE behaviour. Also, it can be left up to the eNodeB to ensure IM-RSs are transmitted when/where needed. The embodiments may have no effect on the PDSCH mapping/rate matching for the served UE.

The required data processing apparatus and functions of a control apparatus for the determination, triggering and/or control of transmissions in relation to feedback messaging may be provided by means of one or more data processor. The described functions may be provided by separate processors or by an integrated processor. The data processors may be of any type suitable to the local technical environment, and may include one or more of general purpose computers, special purpose computers, microprocessors, digital signal processors (DSPs), application specific integrated circuits (ASIC), gate level circuits and processors based on multi core processor architecture, as non limiting examples. The data processing may be distributed across several data processing modules. A data processor may be provided by means of, for example, at least one chip. Appropriate memory capacity can also be provided in the relevant devices. The memory or memories may be of any type suitable to the local technical environment and may be implemented using any suitable data storage technology, such as semiconductor based memory devices, magnetic memory devices and systems, optical memory devices and systems, fixed memory and removable memory.

An appropriately adapted computer program code product or products may be used for implementing the embodiments, when loaded or otherwise provided on an appropriate data processing apparatus, for example for causing determinations if and when dummy data shall be transmitted, for causing transmission of the dummy data and any other related operations. The program code product for providing the operation may be stored on, provided and embodied by means of an appropriate carrier medium. An appropriate computer program can be embodied on a computer readable record medium. A possibility is to download the program code product via a data network. In general, the various embodiments may be implemented in hardware or special purpose circuits, software, logic or any combination thereof. Embodiments of the inventions may be practiced in various components such as integrated circuit modules. The design of integrated circuits is by and large an automated process. Complex and powerful tools are available for converting a logic level design into a semiconductor circuit design ready to be formed on a semiconductor substrate.

It is noted that whilst embodiments have been described in relation to LTE-A, similar principles can be applied to any other communication system where dynamic feedback messaging may be desired. Therefore, although certain embodiments were described above by way of example with reference to certain exemplifying architectures for wireless networks, technologies and standards, embodiments may be applied to any other suitable forms of communication systems than those illustrated and described herein.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. For example, a combination of one or more of any of the other embodiments previously discussed can be provided. All such and similar modifications of the teachings of this invention will still fall within the scope of this invention as defined in the appended claims.

The invention claimed is:

1. A method comprising:
scheduling a multipoint transmission via a downlink channel,
wherein at least one resource element of the downlink channel is empty, and wherein the at least one resource element being empty means being kept free and not used for scheduling the multipoint transmission; inserting data representing interference in said at least one resource element for use in interference measurements, wherein the data representing interference comprises at least one of data of at least one resource element configured for another recipient, random or pseudo random bits or symbols, and downlink channel from another physical resource block:
selecting a modulation and precoding for the data representing the interference that reflects typical operation of a wireless system where wireless communications is provided; and
transmitting the transmission via the downlink channel, wherein transmitting of the data representing interference is controlled by a base station.

2. The method of claim 1, wherein the downlink channel comprises a physical downlink shared channel.

3. The method of claim 1, further comprising applying in a physical resource block similar or a different modulation and precoding for said data representing the interference than for downlink channel data.

4. The method of claim 1, wherein the base station comprises or is comprised by an enhanced NodeB.

5. The method of claim 1, further comprising transmitting by means of a coordinated multipoint transmission mechanism and rate matching a physical downlink shared channel around said at least one resource element, wherein said data representing interference is for use in estimation of channel state information by a user equipment.

6. The method of claim 1, further comprising dynamic selection of a transmission point.

7. The method of claim 1, further comprising joint transmission from multiple transmission points.

8. An apparatus comprising: at least one processor, and at least one memory including computer program code, wherein the at least one memory and the computer program code are configured, with the at least one processor, to schedule a multipoint transmission via a downlink channel,
wherein at least one resource element of the downlink channel is empty, and wherein the at least one resource element being empty means being kept free and not used for scheduling the multipoint transmission;
insert data representing interference in said at least one resource element for use in interference measurements, wherein the data representing interference comprises at least one of data of at least one resource element configured for another recipient, random or pseudo random bits or symbols, and downlink channel from another physical resource block;
select a modulation and precoding for the data representing the interference that reflects typical operation of a wireless system where wireless communications is provided; and
transmit the transmission via the downlink channel.

9. The apparatus of claim 8, wherein the downlink channel comprises a physical downlink shared channel.

10. The apparatus of claim 8, configured to apply similar or a different modulation and precoding for the data representing the interference than for downlink channel data in a physical resource block.

11. The apparatus of claim 8, configured to the transmission are provided by means of a coordinated multipoint transmission mechanism, a physical downlink shared channel is rate matched around said at least one resource element left empty, and said data representing interference is for use in estimation of channel state information by a user equipment.

12. The apparatus of claim 8, wherein the at least one memory and the computer program code are further configured, with the at least one processor, to dynamically select a transmission point.

13. The apparatus of claim 8, wherein the multipoint transmission comprises joint transmission from a multiple of transmission points.

14. A computer program product embodied on a non-transitory computer readable medium storing a program of instructions, execution of which by a processor configures an apparatus to at least:

scheduling a multipoint transmission at least one resource element of the downlink channel is empty, wherein the at least one resource element being empty means being kept free and not used for scheduling the multipoint transmission; inserting data representing interference in said at least one resource element for use in interference measurements, wherein the data representing interference comprises at least one of data of at least one resource element configured for another recipient, random or pseudo random bits or symbols, and downlink channel from another physical resource block: and selecting a modulation and precoding for the data representing the interference that reflects typical operation of a wireless system where wireless communications is provided; and     transmitting the transmission via the downlink channel.

* * * * *